US010181975B2

(12) United States Patent  
Chellappan (10) Patent No.: US 10,181,975 B2  
(45) Date of Patent: Jan. 15, 2019

(54) OVERRIDE SUBSYSTEMS FOR RAPID RECOVERY FROM SERIAL-LINK ERRORS

(71) Applicant: Intel Corporation, Santa Clara, CA (US)

(72) Inventor: Satheesh Chellappan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 14/846,711

(22) Filed: Sep. 4, 2015

(65) Prior Publication Data

US 2017/0070381 A1    Mar. 9, 2017

(51) Int. Cl.
*H04L 12/24*    (2006.01)
*H04L 12/26*    (2006.01)
*H04L 29/08*    (2006.01)

(52) U.S. Cl.
CPC ...... *H04L 41/0654* (2013.01); *H04L 43/0823* (2013.01); *H04L 69/323* (2013.01); *H04L 69/324* (2013.01)

(58) Field of Classification Search
CPC .............. H04L 41/0654; H04L 69/323; H04L 43/0823; H04L 45/745; H04L 47/62; H04L 49/3027
See application file for complete search history.

(56) References Cited

U.S. PATENT DOCUMENTS

| 5,717,689 A | 2/1998 | Ayanoglu |
| 6,369,855 B1 | 4/2002 | Chauvel et al. |
| 2003/0174726 A1* | 9/2003 | Dove ............... G06F 13/4072 370/463 |
| 2008/0267192 A1* | 10/2008 | Blinick ............ H04L 49/555 370/395.7 |
| 2011/0158108 A1* | 6/2011 | Chan ............... H04L 43/50 370/250 |
| 2013/0088242 A1 | 4/2013 | Lundstrum et al. |
| 2013/0262731 A1* | 10/2013 | Ranganathan ...... G06F 13/426 710/305 |
| 2014/0105029 A1* | 4/2014 | Jain ............... H04L 43/0811 370/242 |
| 2014/0153384 A1* | 6/2014 | Ishiyama ............ H04L 45/28 370/225 |
| 2014/0195830 A1* | 7/2014 | Chin ................ G06F 1/1626 713/320 |
| 2016/0077799 A1* | 3/2016 | Matsui ................ G06F 5/14 714/56 |

\* cited by examiner

*Primary Examiner* — Andrew Chriss  
*Assistant Examiner* — Voster Preval  
(74) *Attorney, Agent, or Firm* — Schwabe, Williamson & Wyatt, P.C.

(57) ABSTRACT

An override subsystem on the host side of a serial data link between the host and a peripheral detects and diagnoses link errors by comparing the states of the port's link-layer component and physical layer. An override controller accesses a data-store containing stored policies for responding to particular errors. After selecting the appropriate policy, the override controller takes control of the physical layer, the link-layer component, or both, reconfigures them according to the policy to correct the errors, and returns control of the physical layer to the host controller and link-layer component. As well as error recovery, the override subsystem may be used by applications or drivers to asynchronously manage power consumed by the link.

16 Claims, 9 Drawing Sheets

MIPI MPHY State Transitions

| | Disable | Hibern8 | Sleep | PWM burst | Stall | High Speed Burst | Line Reset |
|---|---|---|---|---|---|---|---|
| Disable | | R | R | x | R | x | x |
| Hibern8 | A | | R | x | R | x | x |
| Sleep | A | R | | x | R | x | x |
| PWM burst | A | R | A | | x | x | x |
| Stall | A | R | R | x | | x | x |
| High Speed Burst | A | R | x | x | A | | x |
| Line Reset | A | R | x | x | x | x | |

OVERRIDE SUBSYSTEMS FOR RAPID RECOVERY FROM SERIAL-LINK ERRORS

FIELD

Related fields include digital communication, and more, particularly early detection of, and quick recovery from, errors on a serial communication link between a host and a peripheral.

BACKGROUND

The computing field includes many examples of a host (master) controller controlling one or more peripheral (slave) devices via a serial data link. Some of the most familiar examples are links between "desk-scale" devices such as laptop computers, smartphones, tablets, printers, keyboards, mice, storage components, scanners, cameras, microphones, speakers, and the like using such serial protocols as Peripheral Component Interconnect Express (PCIe), Universal Serial Bus (USB), or Serial Advanced Technology Attachment (SATA). However, similar scenarios occur on the board scale (connections between chips on the same board) and on the chip scale (connections between different functional components fabricated on the same chip) using protocols such as Mobile Industry Processing Interface (MIPI). Such control connections may be important for satisfactory performance of system-on-chip (SoC) platforms.

Besides the physical connection (e.g., coaxial cable, copper wire, conductive trace, or optical waveguide), physical and logical network components at the nodes or termini (for example, the communication ports of the host and peripheral) are also considered part of the link. These physical and logical network components may include one or more "link-layer components" (e.g., bridges or switches) that implement one or more link protocols (sets of methods and standards for transmitting and receiving messages over the physical connection). Media access control (MAC) components are examples of link-layer components. Each link-layer component may be associated with a physical layer (e.g., PHY), a physical layer interface component between the link-layer component and the physical connection that may include a transmitter, receiver, or transceiver. The physical layer may encode data for transmission, decode data upon reception, and automatically negotiate data rates and other transmission parameters with its opposite number at the connected node, for example using a physical coding sublayer (PCS). The physical layer may also be responsible for controlling the timing of the transmission or reception of the individual bits of data and interacting with the physical connection in a way that takes account of its properties, for example using the physical medium-dependent sublayer (PMD). Occasionally, a peripheral connected to a host may malfunction or lose its synchronization with the host. Resulting operational errors may include attempting to send a message before completing the required handshake procedure; omitting an "end-transmission" signal such as End Of Burst (EOB), causing the communication line to remain open and the receiver to continue to wait for more data when in fact the message has been completely transmitted; premature waking from a suspended state (e.g., stall, sleep, or hibernate) in response to a false wake indication or a false "incoming burst" indication; or a handshake procedure that "hangs" or "freezes" when fabric error or addressing error causes incorrect memory access for the physical layer. The peripheral may be spontaneously disconnected from the host or experience a loss of power. The communication line may be left unterminated and "floating," burdened with a high differential impedance on the signal paths, preventing the host or the peripheral from returning to a low-power state.

Often, such errors disrupt the functioning of the host substantially more than they disrupt the peripheral. Most typically, the disruption affects the receiver interface of the host's downstream-facing port. Even if the peripheral recovers without a reset, the host may not be able to, resulting in loss of the connection session. The errors can cause problems whether the host is in an operating state or in a suspended state. In some instances, both the host and the peripheral may be in the intended state, but a physical layer may be in an unintended state.

In some cases, uncorrected errors may trigger a cascade of other errors. A failed link may trigger failures at one or both endpoints, driver notification, or another kind of multilevel failure.

Previous recovery methods for disconnects or synchronization loss have involved recoding through the link drivers and other protocol-based or system-level approaches. These processes could take as long as 1-10 seconds to restore normal operation. If a link failure is allowed to become a multi-level failure before correction, recovery may take an especially long time.

Recovery time is part of an overall "protocol overhead" metric. Other contributors include the loss of context of the peripheral driver(s) and the power consumed by the recovery process. If timeouts are long enough and frequent enough, they may negatively impact the energy efficiency or computing power of the overall system as well as the user experience.

Therefore, a need exists for a recovery process with lower protocol overhead, particularly one that shortens the recovery time. The present disclosure addresses this need.

DETAILED DESCRIPTION

Disclosed herein includes a system which provides early detection of, and quick recovery from, errors on a serial communication link between a host and a peripheral. In the following description, various aspects of the illustrative implementations will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials and configurations are set forth in order to provide a thorough understanding of the illustrative implementations. However, it will be apparent to one skilled in the art that the present disclosure may be practiced without the specific details. In other instances, well-known features are omitted or simplified in order not to obscure the illustrative implementations.

An override subsystem in a host controller detects errors in a serial communication link by reading a status register. Policies for identifying and responding to various types of link errors are stored for quick retrieval (e.g., in firmware, high-speed non-volatile memory, or one or more fixed-function machines). The policies may include having the firmware temporarily override normal operation of a link-layer component or an interface between the link-layer component and the physical layer (e.g., PHY) so that the firmware can directly access and manage the physical layer state. The operation of the recovery components is controlled by an override controller.

The override controller collects status data and sends override and management signals over a network of override data paths. The override data paths are multiplexed with the data paths that normally control the link-layer component, the physical layer interface, and physical layer. By default, each multiplexer selects the normal operating signals to pass to the link-layer component, link-layer/physical layer interface, and physical layer. Upon receiving an override command, however, the multiplexer(s) will deselect the normal operating signal paths and select the override data paths as the inputs to the physical layer. Because of its prompt error detection and direct interface with physical layer hardware, recovery from a link error using the override subsystem is expected to take less than one second, typically tens to hundreds of microseconds.

The override subsystem, in some embodiments, may be used for other tasks (besides link-error recovery) where a benefit results from overriding normal operating signals. For example, when a "hot unplug" occurs (i.e., a peripheral is disconnected without first powering down the host or going through an eject-type isolation of the port), the override subsystem may interrupt normal operating signals (e.g., a sudden uncontrolled disconnect) to disable the unplugged port. On other occasions, the override subsystem may asynchronously take a communication out of normal operation to put a communication line in low-power mode when needed, such as when a battery or other power source is near depletion. Moreover, the override subsystem may alternatively be employed to restore any stored data or software on the host (or accessible to the host) that has been corrupted by faulty communication with a peripheral.

In a larger context, the override subsystem may be controlled by software, firmware, or hardware to intentionally manipulate physical layer states whenever a particular flow is desired but not provided by normal link operation.

GENERALIZED EXAMPLES

Figure 1A:
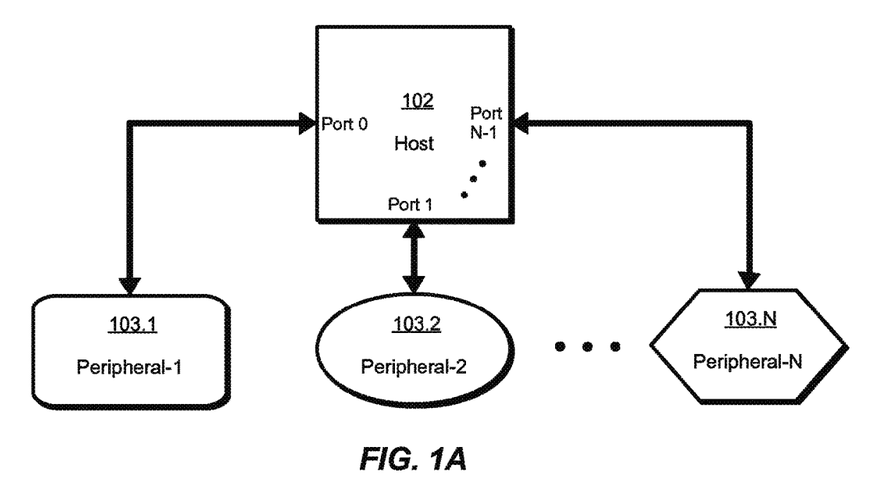
FIGS. 1A-1B are block diagrams of examples of generic host-peripheral serial connections.
Figure 1B:
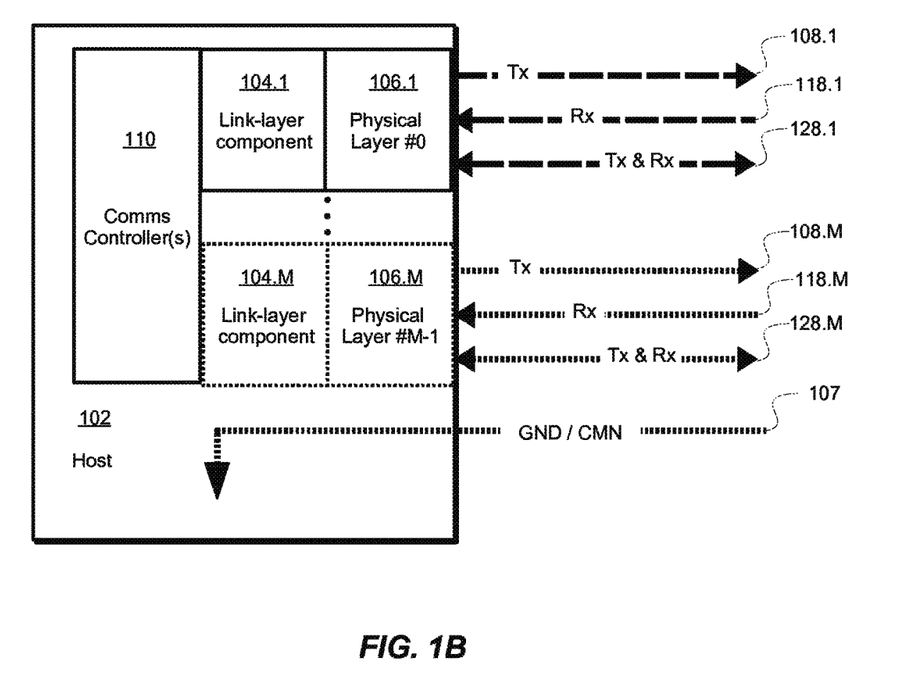

FIGS. 1A-B are block diagrams of examples of generic host-peripheral serial connections.

In FIG. 1A, a host 102 is connected with an arbitrary number N of peripherals: first peripheral 103.1, second peripheral 103.2, up to Nth peripheral 103.N. Each of the peripherals 103.1-103.N is shown connected to its own separate communication port on host 102. The block diagram may represent macroscopic devices linked by, e.g., USB serial connections, components of a SoC all residing on a single chip linked by, e.g., MIPI connections, or any other host-peripheral arrangement using serial connections.

The maximum number N of peripherals connectable to a given host 102 may be a power of 2. In some conventions, the ports are numbered from 0 to N−1 to correspond to bits written in registers, memory, etc. For example, as illustrated, first peripheral 103.1 is connected to Port 0 (or "#0") of host 102; second peripheral 103.2 connected to Port 1 (or "#1"); and Nth peripheral 103.N is connected to Port N−1 (or "#N−1"). Link errors on any of the ports #0-#N−1 may increase power consumption by the overall system. In some cases, a link error may cause host 102 to freeze, hang, or crash, affecting the other peripherals as well.

FIG. 1B shows the general arrangement of some basic parts of links on an example of a host that may be suitable for an override subsystem. A communications controller (or first controller) 110 controls normal operation of some number M of links (M>=1), which may include generating and routing messages being sent, as well as analyzing and reacting to messages being received. Communications controller 110 may be a stand-alone controller or part of a larger, more general-purpose controller.

Each link has a link-layer component 104.1-104.M to, among other things, implement the serial protocol used by the links (e.g., USB, MIPI, PCIe, or SATA). Each link-layer component interacts with the corresponding physical connection via a physical layer, 106.1-106.M that sends and receives the messages. Physical layer 106.1 may transmit messages over a first physical connection 108.1 and receive messages over a second physical connection 118.1, or alternatively may transmit and receive over a single physical connection 128.1. Likewise, physical layer 106.M may transmit messages over a first physical connection 108.M and receive messages over a second physical connection 118.M, or alternatively may transmit and receive over a single physical connection 128.M. Physical connections 108.1-108.M and 118.1-118.M, or 128.1-128.M may be twisted pairs of wires, coaxial cables, conductive traces, high-speed buses, optical fibers or other optical waveguides, or any other suitable data connection. The transmitted and received data signals may be differential or non-differential. The internal addresses of the link-layer components 104.1-104.M, PHYs 106.1-106.M, and physical connections 1*8.1 to 1*8.M may include numbers 0 through M−1.

In some connection types, a common physical connection 107, providing a voltage reference similar to a ground wire, may be included in the link. As illustrated, several links may share a single common physical connection 107 (e.g., in MIPI links). Alternatively, each link may include its own separate common physical connection 107 (e.g., in USB links).

If only these components are present, errors may be monitored and corrected at a system level, or using the operating protocol. This approach may have an undesirably long latency, which may increase power consumption, may allow the original error enough time to trigger other errors, or may be experienced negatively by users as slow processing.

Figure 2A:
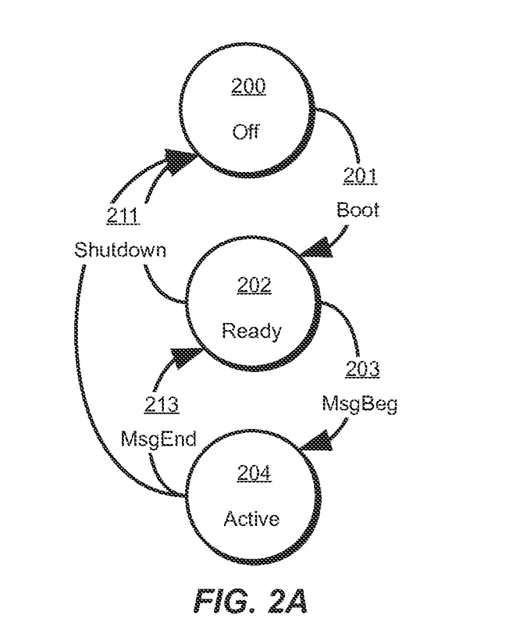
FIGS. 2A-2B are examples of state diagrams for basic finite state machines (FSMs) for simple generic serial links.
Figure 2B:
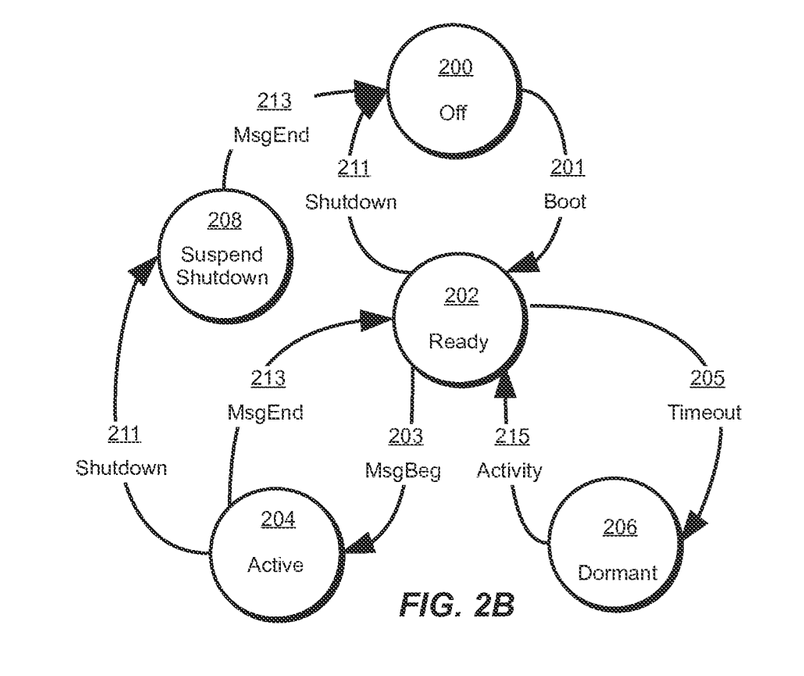

FIGS. 2A-B are examples of state diagrams for basic finite state machines (FSMs) for simple generic serial links.

FIG. 2A is a state machine for an elementary link. This link has only three states: "Off" state 200, an unpowered state from which it cannot send or receive messages; "Ready" state 202, powered/initialized and capable of sending or receiving messages, but not presently sending or receiving any messages; and "Active" state 204, presently sending or receiving a message. If the link is in "Off" state 200, "Boot" or power-up signal 201 triggers "Ready" state 202. When the link is in "Ready" state 202, a "Message begin" signal 203 may trigger "Active" state 204, or alternatively a "Shutdown" signal 211 may trigger "Off" state 200. When the link is in "Active" state 204, a "Message end" signal 213 may return it to "Ready" state 202", or alternatively a "Shutdown" signal 211 may return it to "Off" state 200.

FIG. 2B is a state machine for the elementary link of FIG. 2A with two additional states to improve operation. Besides "Ready" state 202, "Active" state 204, and "Off" state 200, which have the same triggering signals 201, 211, 203, and 213 of FIG. 2A, the link has "Dormant" state 206 and "Suspend shutdown" state 208.

"Dormant" state 206 is a power-saving state. Instead of being kept in a power-consuming "Ready" state 202 indefinitely, a "Timeout" signal 205 arrives a predetermined time after the most recent "Message end" signal 213 or "Boot" signal 201, causing the link to transition into "Dormant" state 206. "Dormant" state 206 uses less power than "Ready" state 202, but it can be changed to "Active" state 204, if needed, in less time than it takes to transition from "Off" state 200 to "Active" state 204. Once some message-preparatory activity (or even a "Message begin" signal 203) is sensed, the link receives "Activity" signal 215, which returns the link to "Ready" state 202. In some implementations, once the link returns to "Ready" state 202 based on the previously received "Message being" signal, the link transitions to "Active" state 204.

"Suspend Shutdown" state 208 is a protective state that prevents message loss, or other possible physical damage or data corruption, when a "Shutdown" signal 211 occurs during "Active" state 204. While the link is in "Active" state 204, a "Shutdown" signal 211 triggers a transition to "Suspend shutdown" state 208 instead of "Off" state 200. The link remains in "Suspend shutdown" state 208 until "Message end" signal 213 arrives to indicate that the current message has been completely sent or received. Afterward, the link can safely transition to "Off" state 200.

Each contingency considered, each risk mitigated, and each feature added may add more states and signals to the state machine. The examples in FIGS. 2A-B are for normal link operation.

Figure 3:
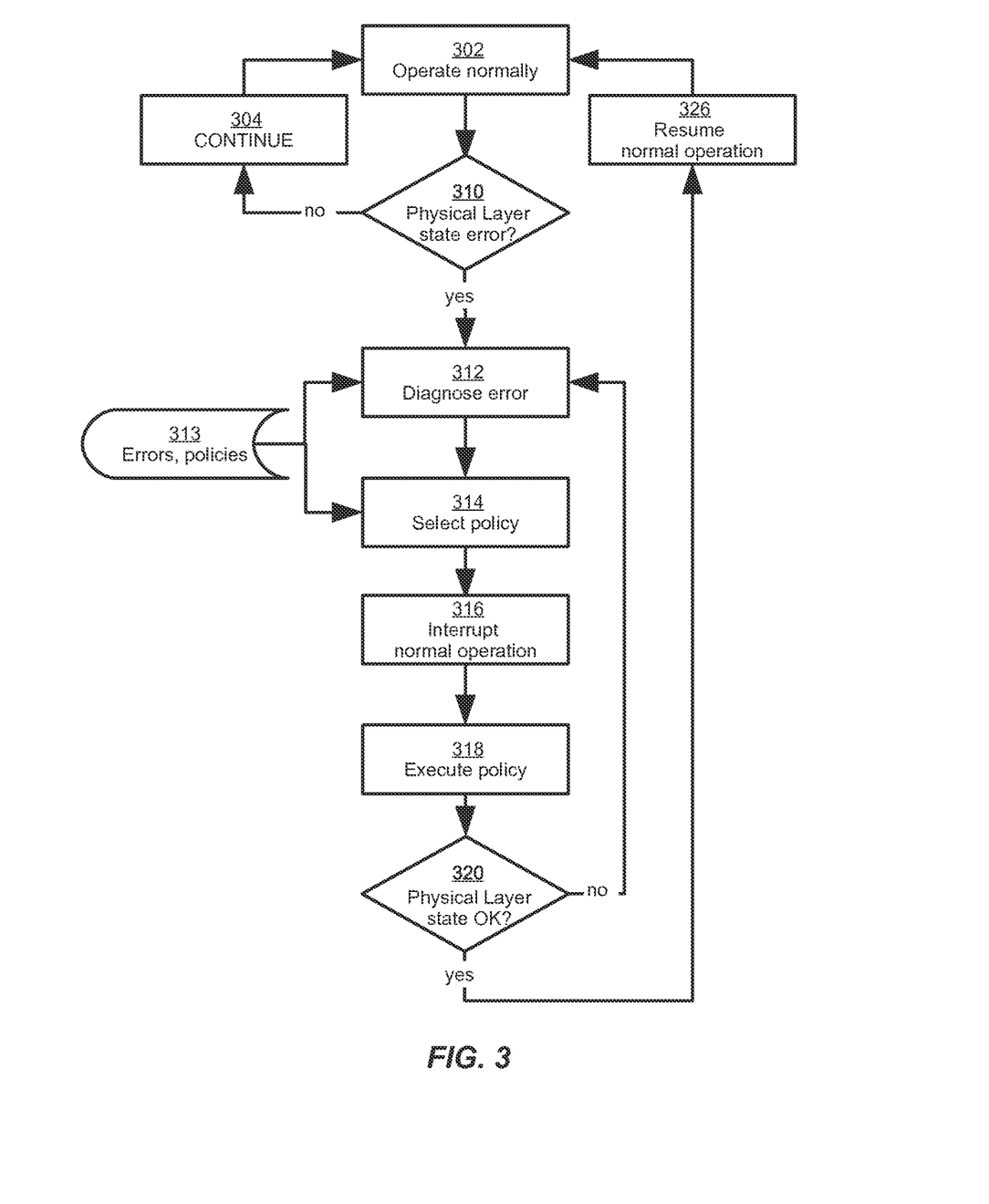
FIG. 3 is a flowchart of an example of a process for overriding normal link operation to correct link errors.

FIG. 3 is a flowchart of an example of a process for overriding normal link operation to correct link errors. The link operates normally at step 302. If a monitoring operation (e.g., polling a status register or arranging that an error appearing in the status register activates an override controller) does not find a physical layer state error at decision 310, the link continues to operate normally at step 304. If, instead, the monitoring operation finds a physical layer state error at decision 310, the override controller diagnoses or identifies the error at step 312.

The override controller accesses error IDs and corresponding policies (e.g., a lookup table or a database) in data-store 313. The policies include actions for the override controller to take to correct each expected type of physical layer state error. The override controller selects a policy corresponding to the diagnosed or identified error at step 314. The override controller then interrupts normal operation at step 316 to take control of the physical layer and/or the link-layer component and execute the policy at step 318. In some embodiments, the errors may be sensed as error codes in a first register and the corresponding policies may be identified as policy codes in a second register. However, any suitable override activation stimulus, e.g., a signal going out of an acceptable range of amplitude, frequency, stability, or other measurable characteristic sensitive to link errors may be used to trigger the override process.

If the override controller determines that the physical layer is operating acceptably at decision 320, it terminates the override and cedes control back to the communications controller, allowing the link to resume normal operation at step 326. In some embodiments, the acceptable operation may be sensed as a "no-error code" in the first register. If on the other hand, the override controller determines that the physical layer is still not operating acceptably at decision 320 (e.g., perhaps there is a second error), it returns to step 312's error diagnostics and selects and executes a policy to correct the remaining error.

Figure 4:
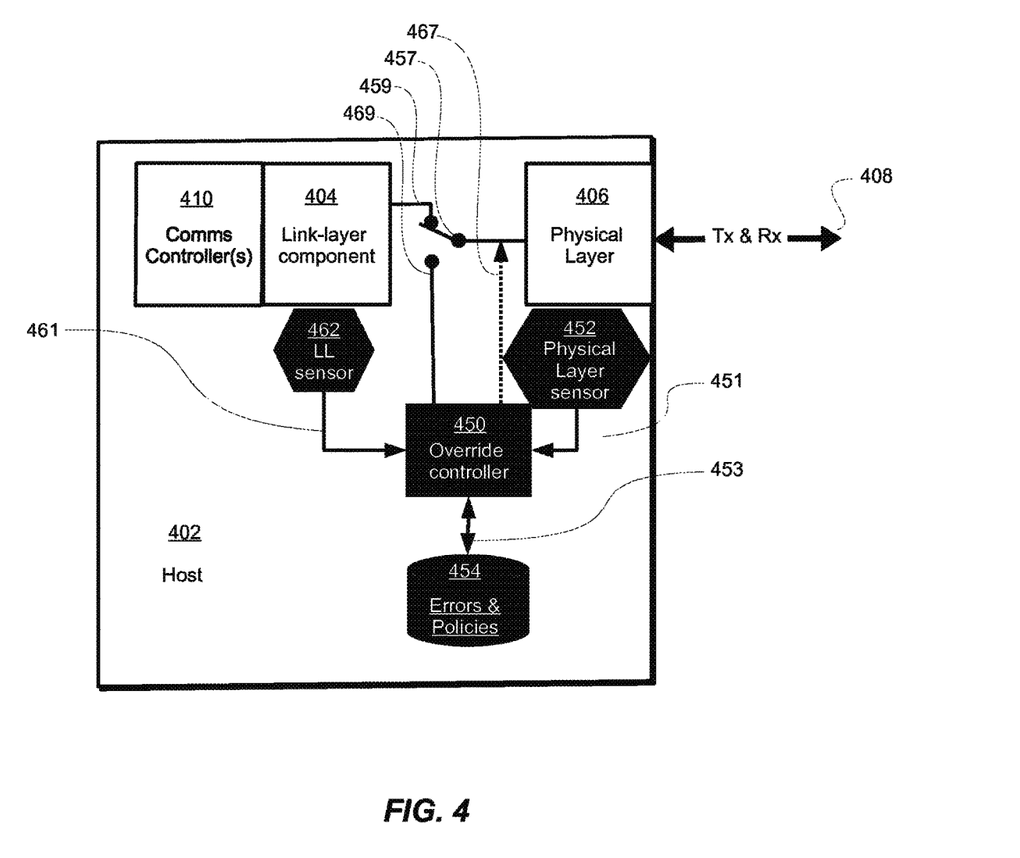
FIG. 4 is a functional block diagram of an example of an override subsystem in a serial link.

FIG. 4 is a functional block diagram of an example of an override subsystem in a serial link. Communications controller 410, link-layer component 404, physical layer 406, and physical connection(s) 408 are present on host 402, similarly to an unmodified link. However, a physical layer input selector 457, if put into a first configuration, can connect link-layer component output 459 to physical layer 406 for normal link operation. This is the configuration illustrated in FIG. 4. Alternatively, physical layer input selector 457, if put into a second configuration, can connect override controller output 469 to physical layer 406 for error correction or some other asynchronous override.

Override controller 450 controls the configuration of physical layer input selector 457 via selector control path 467. In the absence of a reason to override link-layer component 404, override controller 450 leaves physical layer input selector 457 configured to pass link-layer component output 459 to physical layer 406 for normal operation. However, if physical layer state sensor 452, link-layer state sensor 462, or both detect a link error or another reason to deviate from normal operation, override controller 450 reconfigures physical layer input selector 457 to bypass link-layer component output 459, instead passing override controller output 469 to physical layer 406.

The activation circuit may include any combination of components to (1) sense a link error and respond by disconnecting the host (comms) controller 410 and connecting the override controller 450 to the physical layer, and (2) sense a correction, disappearance, or absence of a link error and respond by disconnecting the override controller 450 and connecting the host (comms) controller 410 to the physical layer. In some embodiments, the activation circuit wakes the override controller from a suspended state upon sensing a link error and returns the override controller to the suspended state when the error is corrected and no other errors are sensed. Physical layer state sensor 452 and link-layer state sensor 462 may represent any known way to detect a link error, or to detect some other present or potential problem that can be corrected or mitigated by executing one of the stored policies on data-store 454. Physical layer state sensor 452 and link-layer state sensor 462 may continually monitor the states, or may begin operating after some trigger such as another component. Override controller 450 may be a separate controller or a partially autonomous part of a larger controller. Stored error identifications (IDs) and corresponding policies on data-store 454 may be in read-only memory, rewritable nonvolatile memory, hardware logic, or any other known suitable storage medium and may be in the form of a lookup table, database, or other suitable known data structure. Physical layer input selector 457 may be a logic switch, multiplexer, or other component that selects one of at least two inputs to transmit while blocking others, and can be controlled to select which inputs are passed and blocked. Override data paths 451, 453, 461, 467 and 469 may, in some embodiments, be independent of other nearby data paths.

MIPI Examples

MIPI is a widely used communication standard for mobile devices and other SoC and inter-chip links. These examples are intended to illustrate some embodiments of override subsystems, but not to limit the scope of applicability. Those skilled in the art will recognize how this type of apparatus and method may be adapted for other serial protocols with similar characteristics.

Figure 5:
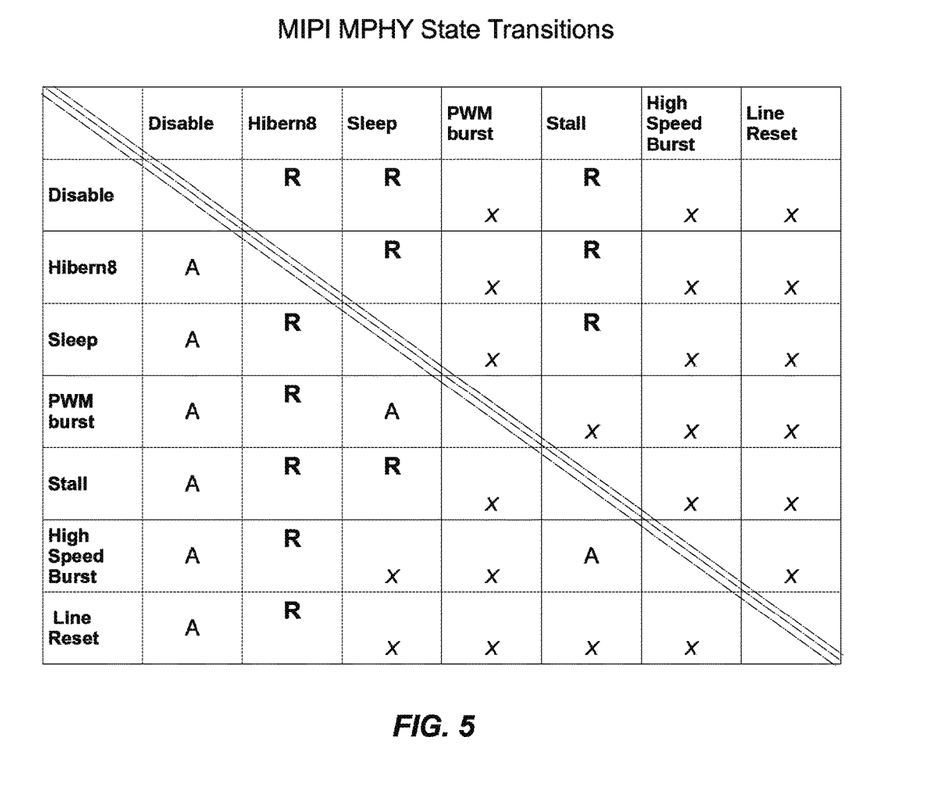
FIG. 5 is an example of a table of possible Mobile Industry Processing Interface (MIPI) states and the transitions between them that may be overridden by an override subsystem and its firmware.

FIG. 5 is an example of a table of possible Mobile Industry Processing Interface (MIPI) states and the transitions between them that may be overridden by an override subsystem and its firmware. "PWM burst" and "High Speed Burst" are Active states. "Sleep," "Stall," and "Line Reset" are Ready states. "Hibern8" is a Dormant state. "Disable" is a local "Off" state (the link may be turned off while other elements of the host remain powered or operating).

"R" marks register-dependent transitions that may be controlled by override firmware if the override firmware has access to the MIPI PHY (MPHY) register(s). "A" marks autonomous transitions that may be controlled by override firmware without MPHY register access. "X" marks transitions that are invalid for the MIPI protocol or cannot be overridden by firmware.

Many states and transitions in MIPI depend on registers. Therefore, reading and writing registers may be a suitable approach to sensing errors, selecting policies, and reconfiguring or otherwise controlling the MPHY using an override subsystem.

Figure 6:
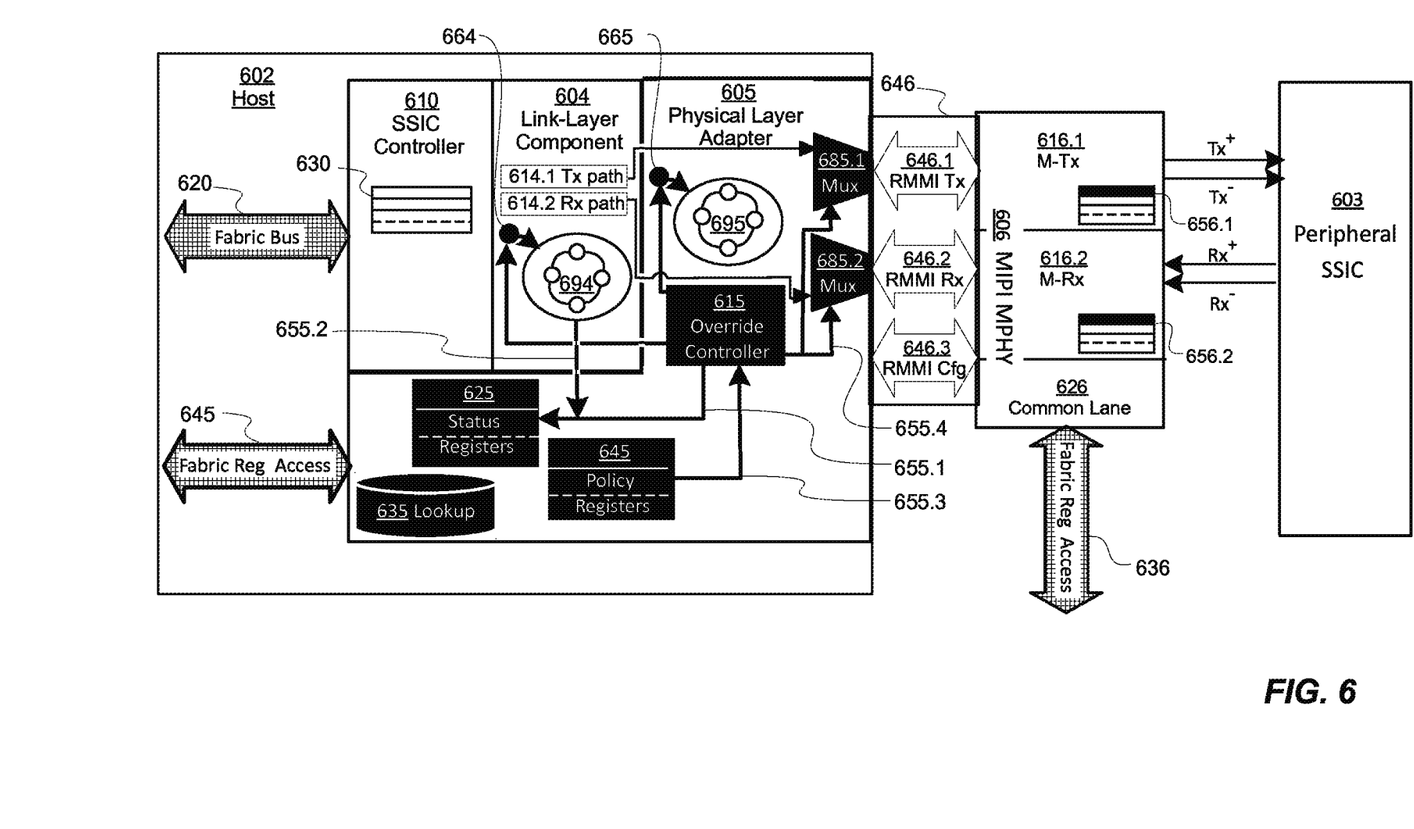
FIG. 6 is a block diagram of an example of a MIPI link with an override subsystem configured to manage the MIPI PHY (MPHY) state.

FIG. 6 is a block diagram of an example of a MIPI link with an override subsystem configured to manage the MIPI PHY (MPHY) state. The override subsystem may be activated and/or deactivated by software applications or controller drivers, including custom controller drivers. A MIPI link may have one or more data paths ("lanes") and a common (voltage-reference) lane. In this example, the MIPI link has separate lanes for transmitting and receiving.

The signals are differential (Tx+, Tx−, Rx+ and Rx−).

The basic host-side link subsystem for normal or default communication between host 602 and peripheral Super Speed Inter-Chip (SSIC) (or other controller for a connected peripheral) 603 includes the following: host SSIC (or comparable, e.g., Universal Flash Storage (UFS) or S-core 400 MHz MEX) controller 610, link-layer component 604, Reference MPHY Module Interface (RMMI) 646, and MPHY 606.

SSIC controller 610 may ordinarily include fabric bus 620 and standard controller register(s) 630. Link-layer component 604 may ordinarily include link-layer transmission path 614.1, link-layer reception path 614.2, and standard Link Training Status and State Machine (LTSSM) 694. RMMI 646 may ordinarily include RMMI transmission interface 646.1 and RMMI reception interface 646.2. MPHY 606 may ordinarily include MPHY transmitter block 616.1, MPHY transmitter private register 656.1, MPHY receiver block 616.2, MPHY receiver private register 656.2, MPHY common lane 626, and MPHY fabric register access 636.

The override subsystem adds a new interface, the override physical layer adapter 605, between link-layer component 604 and MPHY 606. The physical layer adapter 605 has a pair of multiplexers to select normal or override inputs and outputs (i.e., perform the selector function). Transmission multiplexer 685.1, by default, passes link-layer transmission path 614.1 for ordinary transmission. Reception multiplexer 685.2, by default, passes link-layer reception path 614.2 for ordinary reception. When the override subsystem takes over link operation, however, multiplexers 685.1 and 685.2 block the link-layer signals and instead connect the physical layer to override transmission and reception paths 655.4. The override physical layer adapter 605 may include its own override LTSSM 695 to use when standard Link Training and Status State Machine (LTSSM) 694 is bypassed during an override.

In some embodiments, physical layer adapter 605, link-layer component 604 and MPHY 606 may be self-contained separate parts as pictured. Alternatively, they may share packaging or each may be constituted of multiple separate components themselves. Any system that includes default transmission and reception paths and a default LTSSM connected together to interact with the physical layer in the absence of link errors may be considered as having a "link interface module." Any system that includes alternate transmission and reception paths, an alternate LTSSM, a controller other than the host controller, an error sensor, a policy lookup, and a multi-line feed of the default and alternate transmission and reception paths that blocks at least one of the default path set or the alternate path set at any given time, connected together to interact with the physical layer in the presence of link errors may be considered as having a "physical interface module." Any system that includes a physical layer carrying signals to and from the default path set or the alternate path set may be considered as having a "physical layer module."

The central control unit for the override subsystem is override controller 615. Override controller 615 is activated when status register(s) 625 indicate an error condition, e.g., a mismatch between the state of link-layer component 604 and the state of MPHY 606. When activated, override controller 615 reads the error status on status register(s) 625 and the corresponding remedial policy on policy register(s) 645; the remedial policy may be stored with the error status on a status/policy lookup data-store 635. Registers 625 and 645 and/or data-store 635 may be on-board in override physical layer adapter 605 or accessible through fabric register access 645. Override controller 615 controls multiplexers 685.1 and 685.2 to replace the normal transmission and reception signals 614.1 and 614.2 with override transmission and reception signals 655.4. Override controller 615 may also remove standard LTSSM 694 from the path via link-layer training override switch 664 and physical layer adapter training override switch 665.

Override controller 615 is coupled to control the link-layer component 604, the override physical layer adapter 605, and an added physical-layer configuration interface, RMMI configuration interface 646.3. RMMI configuration interface 646.3 enables override controller 615 to access MPHY private registers 656.1 and 656.2 and control active and suspended (low-power) states of MPHY 606.

In some embodiments of hosts 602 with multiple links or lanes, link-layer component 604, MPHY 606, and override physical layer adapter 605 may be replicated and independently configurable for two or more of the links or lanes.

Figure 7:
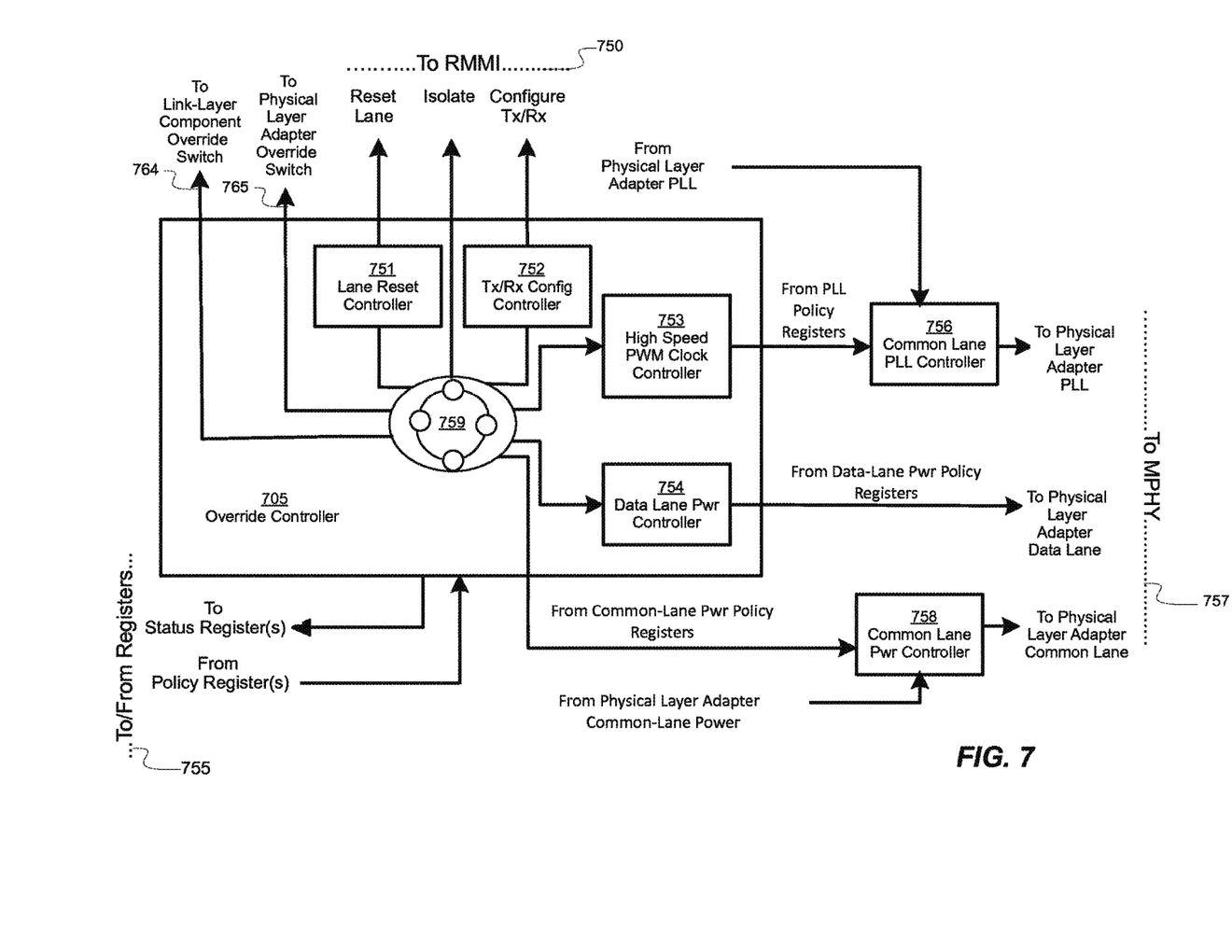
FIG. 7 is a block diagram of an example of components of an override controller for a MIPI link, such as the override controller in FIG. 6.

FIG. 7 is a block diagram of an example of components of an override controller for a MIPI link, such as override controller 615 in FIG. 6. Override controller 705 has an on-board LTSSM 759. Override controller 705 controls the switch(es) that change the link from normal operation to override operation and back, such as, through override switch control 765.

Override controller 705 controls the link through interfaces to some key link components. Through RMMI control interface 750, override controller 705 may reset the lane with a signal from lane reset controller 751, isolate the RMMI, or configure the transmitter or receiver with transmitter and receiver configuration controller 752. Through MPHY interface 757, override controller 705 may control MPHY timing (using high speed or PWM clock controller 753 and common-lane phase-locked loop (PLL) controller 756), control data-lane power (using data-lane power controller 754, or control common-lane power using common-lane power controller 758). Through register interface 755, override controller 705 may update status registers and read the resulting from policy registers.

Examples of status register content may include:

1. Link State [M:0]: Indicates the LTSSM's current state. This could be a binary encoded state or a one-hot encoded state, including any standard state defined by the SSIC/MIPI or other specifications and any private registers defined as custom states in a host controller.

2. Physical Layer Adapter State [N:0]: Indicates Physical Layer Adapter's current state. This could be a binary encoded state or a one-hot encoded state, including any standard state defined by the SSIC/MIPI or other specifications and any private registers defined as custom states in a host controller.

3. Host-protocol error code [E:0]: Indicates an error code in the Physical Layer Adapter's finite state machine, encoded according to policies for host controller (e.g., SSIC) protocol.

Examples of policy register content (actions to be taken by the override controller in response to predetermined status content) may include:

1. Enable: Activate override firmware.

2. Target Link State [M:0]: Cause override firmware to request the target's link-layer component state. "Target" in this context means the link whose normal operation is being overridden.

3. Target Physical Layer Adapter State [N:0]: Cause override firmware to request the target's Physical Layer Adapter state.

4. Target PLL Enable [1:0]: Cause override firmware to enable the target's high-speed clock PLL or its PWM clock PLL.

5. Timeout-Disable Enable: If the override process times out, the override controller will set the physical layer lane(s) to DISABLE state.

6. RMMI Register Update: Cause override firmware to update the MPHY register as part of a requested override. The specific content of the register after the update may be determined by hardware.

Figure 8:
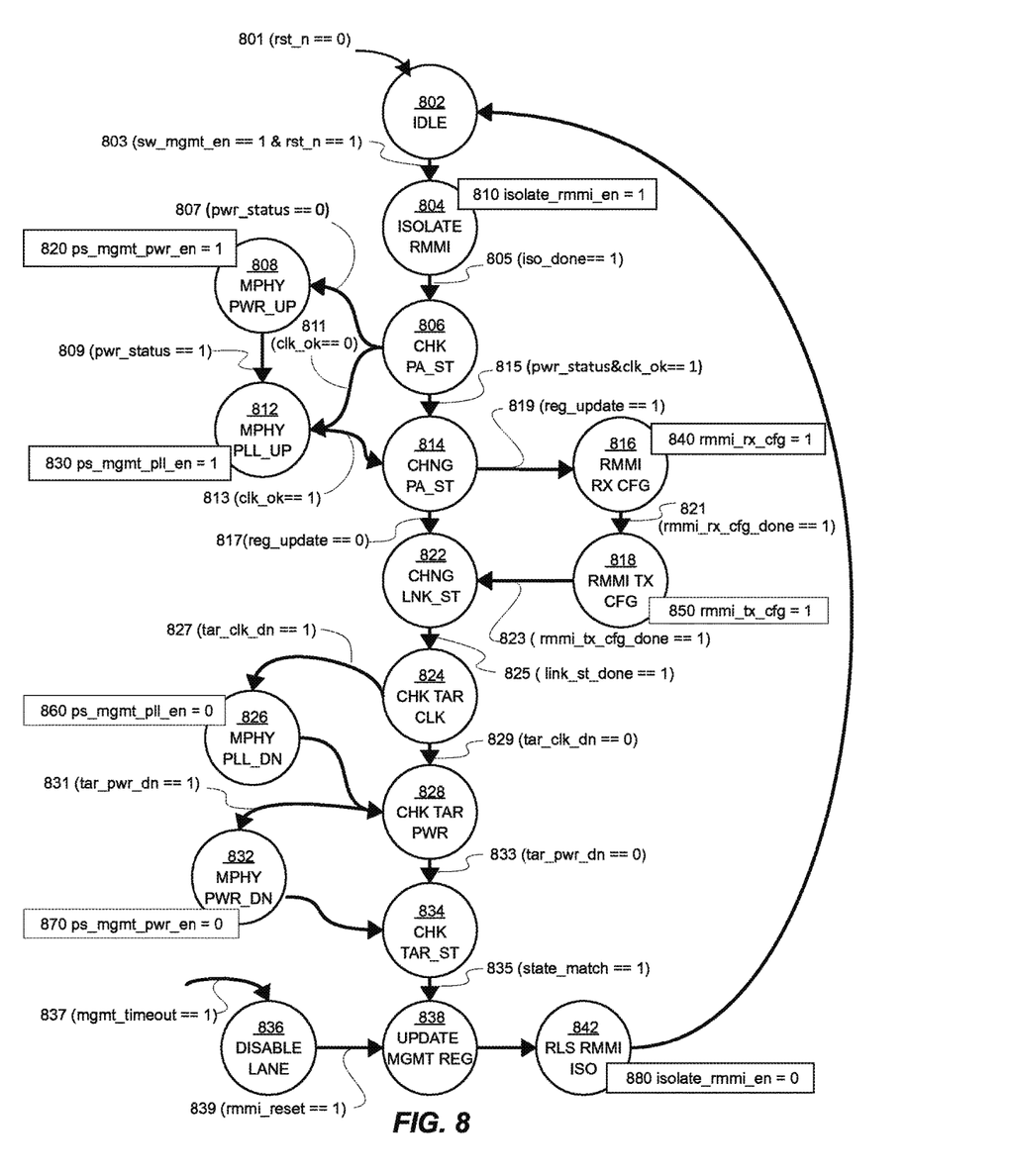
FIG. 8 is a state diagram for a MIPI override controller.

FIG. 8 is a state diagram for a MIPI override controller. This state diagram could be applied to the override subsystem described in, e.g., FIGS. 6 and 7. The signals of the format x=={0 or 1} may be read from the status registers. The corresponding policy retrieved from storage will prescribe a set of "target values" for the various components of the MPHY, the physical layer adapter, and the link-layer component.

The default state of the override controller, while receiving signal 801, rst_n==0 (from an arbitrary source to the override controller or other functional unit blocks), meaning that no asynchronous reset has triggered a presently active override, is IDLE state 802 (i.e., the override subsystem is idle while the MPHY is controlled by the host controller for normal operation).

Signal 803, sw_mgmt_en==1 combined with rst_n==1 (from a policy register in the override subsystem to the override controller) enables an override of MPHY control by the override controller firmware and triggers a transition from IDLE state 802 to ISOLATE_RMMI state 804. ISOLATE_RMMI state 804 isolates the MPHY from the functional data path used in normal operation. In this state, a MUX is reconfigured to block host-controller signals from reaching the MPHY and passes override-controller signals instead. There may be a signal 810, isolate_rmmi_en=1 (from the override controller to the physical layer adapter).

Signal 805, iso_done==1 (from the physical layer adapter to the override controller), is triggered by the completed isolation of the RMMI interface to the physical layer from signals originating from the host controller to pass control of the interface to the override controller, and in turn triggers a transition from ISOLATE_RMMI state 804 to CHK_PA_ST state 806. In CHK_PA_ST state 806, the override controller reads the Physical Layer Adapter status registers for the MPHY's power and timing (PLL) status.

There are three possible paths from CHK_PA_ST state 806 to CHNG_PA_ST state 814. The override controller's choice of a path depends on the power status and clock status read by the override controller at the start of CHK_PA_ST state 806.

Path 1: If power is off

Signal 807, pwr_status==0 (from the MPHY to the override controller), indicates that the data lanes and/or common lanes are not being powered and triggers a transition from CHK_PA_ST state 806 to MPHY_PWR_UP state 808. In MPHY_PWR_UP state 808, the override firmware requests power-up of the MPHY data lanes and common lanes. In multi-link systems, the data-lane power for each link may be controlled by that particular link's individual override controller, while the power for the common lanes in all the links may be controlled by a single link's override controller so that all the links share the same common reference voltage. In this state, the override controller can enable or disable power to the data lanes or the common lane of the MPHY, and there may be a signal 820, ps_mgmt_pwr_en=1, from the override controller through the physical layer adapter to the MPHY.

Signal 809, pwr_status==1 (from the MPHY to the override controller), indicates that the link's data lanes and common lane are now powered and triggers a transition from MPHY_PWR_UP state 808 to MPHY_PLL_UP state 812. In MPHY_PLL_UP state 812, the override firmware requests spin-up of the MPHY_PLL (or, if present, both the high-speed PLL and the pulse-width modulation PLL). In multi-link systems, all the links' PLLs may be controlled by a single override controller to synchronize all the links to the same clock. In this state, the override controller spins the PLL(s) up or down as needed and there may be a signal 830, ps_mgmt_pll_en=1, from the override controller through the physical layer adapter to the MPHY.

Signal 813, clk_ok==1 (from the MPHY to the override controller), indicates that the MPHY PLL is in sync and triggers a transition from MPHY_PLL_UP state 812 to CHNG_PA_ST state 814. In CHNG_PA_ST state 814, the override controller puts the physical layer adapter in the state requested by override firmware.

Path 2: If power is on but PLL/clock is out of sync

Signal 811, clk_ok==0 (from the MPHY to the override controller), indicates that the MPHY PLL is not synchronized and triggers a transition from CHNG_PA_ST state 814 to MPHY_PLL_UP state 812. In MPHY_PLL_UP state 812, the override firmware requests spin-up of the MPHY_PLL (or, if present, both the high-speed PLL and the pulse-width modulation PLL. In multi-link systems, all the links' PLLs may be controlled by a single override controller to synchronize all the links to the same clock. In this state, the override controller spins the PLL(s) up or down as needed and there may be a signal 830, ps_mgmt_pll_en=1, from the override controller through the PHY adapter to the MPHY.

Signal 813, clk_ok==1 (from the MPHY to the override controller), indicates that the MPHY PLL is in sync and triggers a transition from MPHY_PLL_UP state 812 to CHNG_PA_ST state 814. In CHNG_PA_ST state 814, the override controller puts the physical layer adapter in the state requested by override firmware.

Path 2: If power is on and PLL/clock is in sync

Pair of signals 815, pwr_status==1 AND clk_ok==1 (from the MPHY to the override controller), indicate that both the power state and the PLL state match the override firmware's target. It triggers a transition from CHK_PA_ST state 806 directly to CHNG_PA_ST state 814. In CHNG_PA_ST state 814, the override controller puts the physical layer adapter in the state requested by override firmware.

There are two possible paths from CHNG_PA_ST state 814 to CHNG_LNK_ST state 822 The override controller chooses one based on whether the MPHY transmitters and/or receivers are already in the target state prescribed by the policy.

Path 1: If the transmitter or receiver needs reconfiguration

Signal 819, reg_update==1 (from a policy register in the override subsystem to the override controller), indicates that the override firmware requests an update to the MPHY transmitter and/or receiver registers. It triggers a transition from CHNG_PA_ST state 814 to RMMI_RX_CONFIG state 816. In RMMI_RX_CONFIG state 816, the MPHY receiver registers are made accessible for writing and the override firmware reconfigures the MPHY receiver by going through the RMMI to rewrite a standard register of the MPHY, optionally using the same standard interface-configuration signal used by the host controller to configure the MPHY-Rx signal during normal operation. There may be a signal 840, rmmi_rx_cfg=1, from the override controller through the PHY adapter to the MPHY.

In symmetric SSIC systems, the MPHY's transmitter and receiver registers may often need to be changed together.

Signal 821, rmmi_rx_cfg_done==1 (from the MPHY to the override controller), indicates that the override firmware has finished configuring the MPHY receiver and triggers a transition from RMMI_RX_CONFIG state 816 to RMMI_TX_CFG state 818. In RMMI_TX_CFG state 818, MPHY transmitter registers are made accessible for writing and the override firmware reconfigures the MPHY transmitter by going through the RMMI to rewrite a standard register of the MPHY, optionally using the same standard interface-configuration signal used by the host controller to configure the MPHY-Tx signal during normal operation. There may be a signal 850, rmmi_tx_cfg=1, from the override controller through the physical layer adapter to the MPHY.

Signal 823, rmmi_tx_cfg_done==1 (from the MPHY to the override controller), indicates that the override firmware has finished configuring the MPHY transmitter and triggers a transition from RMMI_TX_CFG state 818 to CHNG_LNK_ST state 822. In CHNG_LNK_ST state 822, the override controller overrides the link-layer component to put the LTSSM on the link-layer component into the state requested by the override firmware.

Path 2: If the transmitter and receiver are already configured as the policy prescribes Signal 817, reg_update==0 (from a policy register in the override subsystem to the override controller) indicates that the override firmware has not requested a register update and triggers a transition from CHNG_PA_ST state 814 to CHNG_LNK_ST state 822. In CHNG_LNK_ST state 822 the override controller puts a link-layer component in the state requested by override firmware.

Signal 825, link_st_done==1 (from the link-layer component to the override controller), indicates that the override controller has finished modifying the state of the link-layer controller and triggers a transition from CHNG_LNK_ST state 822 to CHK_TAR_CLK state 824. In CHK_TAR_CLK state 824, the override controller compares the policy's target state for the PLL with actual status of the PLL.

Two possible paths lead from CHK_TAR_CLK state 824 to CHK_TAR_PWR state 828. The choice depends on the override firmware's target PLL states.

Path 1: If the PLL should be in an inactive state

Signal 827, tar_clk_dn==1 (from a policy register in the override subsystem to the override controller), indicates that the override firmware's target state for the MPHY PLL is not an active (e.g., burst) state and the PLL can be spun down. A transition is triggered from CHK_TAR_CLK state 824 to MPHY_PLL_DN state 826. In MPHY_PLL_DN state 826, the override controller spins down the PLL, and there may be a signal 860, ps_mgmt_pll_en=0, from the override controller through the physical layer adapter to the MPHY.

The state machine automatically transitions from MPHY_PLL_DN state 826 to CHK_TAR_PWR state 828. CHK_TAR_PWR state 828 compares the target state of data-lane and common-lane power levels with actual status. Data lanes in active states require power to be on; those in inactive states may be powered down. If all the data-lanes are in inactive states, the common lane may also be powered down.

Path 2: If the PLL is at the target value

Signal 829, tar_clk_dn==0 (from a policy register in the override subsystem to the override controller), indicates that the override firmware's target state for the MPHY_PLL is an active state and the PLL needs to continue running. The signal 829 triggers a transition from CHK_TAR_CLK state 824 to CHK_TAR_PWR state 828. CHK_TAR_PWR state 828 compares the target state of data-lane and common-lane power with actual status. Data lanes in active states require power to be on, while those in inactive states may be powered down. If all the data-lanes are in inactive states, the common lane may also be powered down.

Two possible paths lead from CHK_TAR_PWR state 828 to CHK_TAR_ST state 834. The choice depends on the override firmware's target power states.

Path 1: If the power should preferably be turned off

Signal 831, tar_pwr_dn==1 (from a policy register in the override subsystem to the override controller), indicates that the override firmware's target state for the MPHY power is "off"; data-lanes and common lane can be powered off. The signal triggers a transition from CHK_TAR_PWR state 828 to MPHY_PWR_DN state 832. In MPHY_PWR_DN state 832, all lanes in the link are powered down and there may be a signal 870, ps_mgmt_pwr_en=0, from the override controller through the physical layer adapter to the MPHY.

The state machine automatically transitions from MPHY_PWR_DN state 832 to CHK_TAR_ST state 834. CHK_TAR_ST state 834 compares target states of the physical layer adapter and link-layer component with actual status.

Path 2: If the power should be left on

Signal 833, tar_pwr_dn==0 (from a policy register in the override subsystem to the override controller), indicates that the override firmware's target state for the MPHY power is "on"; data-lanes and common lane will stay powered on. The signal triggers a transition from CHK_TAR_PWR state 828 to CHK_TAR_ST state 834. CHK_TAR_ST state 834 compares target states of the physical layer adapter and link-layer component with actual status.

There are two possible paths to UPDATE_MGMT_REG state 838. The choice depends on whether or not the override process has successfully completed.

1. Override process successfully complete

Signal 835, state_match=1 (a local signal), indicates that the actual MPHY state matches the override firmware's target MPHY state and triggers a transition from CHK_TAR_ST state 834 to UPDATE_MGMT_REG state 838. In UPDATE_MGMT_REG state 838, the override subsystem's status register(s) are updated to indicate that all the override operations prescribed by the policy have been done.

2. Override process times out before completion

Signal 837, mgmt_timeout=1 (a local signal), indicates that the override controller signal has timed out, which suggests that something in the override process has crashed, frozen, or hung. The signal triggers a transition from any state (except IDLE state 802, where the override controller is inactive) to DISABLE_LANE state 836. DISABLE_LANE state 836 disables a lane that is under override control to force-quit the timed-out process so that it does not block normal operations indefinitely.

Signal 839, rmmi_reset=1 (from the override controller to the physical layer adapter), triggers a transition from DISABLE_LANE state 836 to UPDATE_MGMT_REG state 838. UPDATE_MGMT_REG state 838 updates the override status register(s) to indicate which of the override operations prescribed by the policy were done before the timeout. When signal 839 starts the process over, the adjustments that have been done will not be unnecessarily repeated.

The state machine automatically transitions from UPDATE_MGMT_REG state 838 to RELEASE_RMMI_ISO state 842. When in RELEASE_RMMI_ISO state 842, the controller override switches the MUX back to passing signals from the host controller. In this state, MUX override is released to be operated by the host controller and there may be a signal 880, isolate_rmmi_en=0, from the override controller to the physical layer adapter.

The state machine automatically transitions from RELEASE_RMMI_ISO state 842 to IDLE state 802. If the rmmi_reset value is zero (Signal 801), as after a successful override, the override controller stays in IDLE state 802 and the MPHY is controlled by the host controller (normal operation). However, if the rmmi_reset value is one (Signal 839), as in a timed-out override, the override controller bypasses IDLE state 802 and restarts the interrupted override. Whenever the sw_mgmt_en value is one and the rst_n value is one (Signal 803) another override process begins.

Some of the states are associated with a particular lane power or PLL status, while others are not. Lane power may be turned on, unless already on, during MPHY_PWR_UP state 808; may stay on during CHNG_PA_ST state 814, RMMI_RX_CONFIG state 816, RMMI_TX_CFG state 818, CHNG_LINK_ST state 822, CHK_TAR_CLK state 824, MPHY_PLL_DN state 826, and CHK_TAR_PWR state 828; and may be turned off during MPHY_PWR_DN state 832. All the other states may not affect lane power and may not need the lane power to be either on or off. The link PLL, by comparison, may be spun up, unless already up, during MPHY_PLL_UP state 812; may stay on during CHNG_PA_ST state 814, RMMI_RX_CONFIG state 816, RMMI_TX_CFG state 818, CHNG_LINK_ST state 822, and CHK_TAR_CLK state 824; and may be spun down during MPHY_PLL_DN state 826. All the other states may not affect PLL operation and may not need the PLL to be either up or down.

Figure 9:
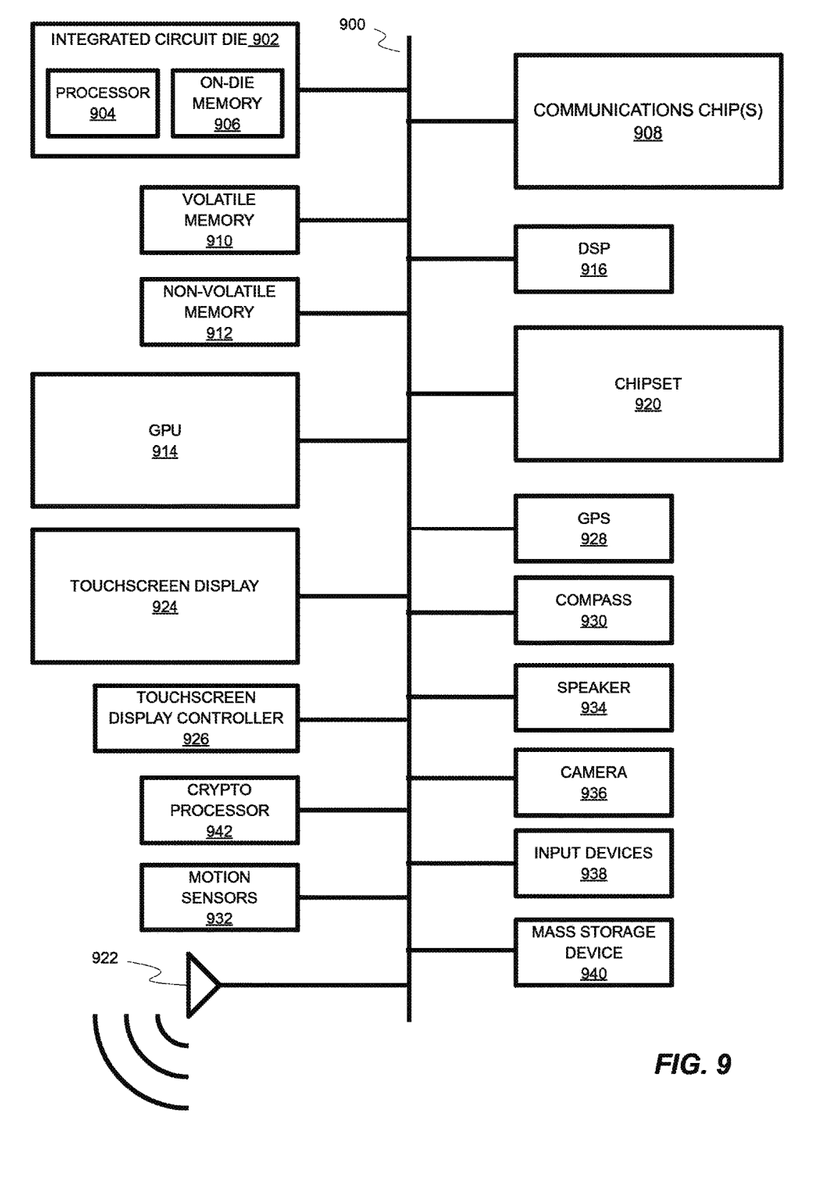
FIG. 9 is a block diagram of an example of a computing device.

FIG. 9 is a block diagram of an example of a computing device. The computing device 900 is an example of a host device and may include a number of components. In one embodiment, these components are attached to one or more motherboards. In an alternate embodiment, these components are fabricated onto a single system-on-a-chip (SoC) die rather than a motherboard. The components in the computing device 900 include, but are not limited to, an integrated circuit die 902 and at least one communication chip 908. In some implementations the communication chip 908 is fabricated as part of the integrated circuit die 902. The integrated circuit die 902 may include a CPU 904 as well as on-die memory 906, often used as cache memory, that can be provided by technologies such as embedded DRAM (eDRAM) or spin-transfer torque memory (STTM or STTM-RAM).

Computing device 900 may include other components that may or may not be physically and electrically coupled to the motherboard or fabricated within a SoC die. These other components include, but are not limited to, volatile memory 910 (e.g., DRAM), non-volatile memory 912 (e.g., ROM or flash memory), a graphics processing unit 914 (GPU), a digital signal processor 916, a crypto processor 942 (a specialized processor that executes cryptographic algorithms within hardware), a chipset 920, an antenna 922, a display or a touchscreen display 924, a touchscreen controller 926, a battery 928 or other power source, a power amplifier (not shown), a global positioning system (GPS) device 928, a compass 930, a motion coprocessor or sensors 932 (that may include an accelerometer, a gyroscope, and a compass), a speaker 934, a camera 936, user input devices 938 (such as a keyboard, mouse, stylus, and touchpad), and a mass storage device 940 (such as hard disk drive, compact disk (CD), digital versatile disk (DVD), and so forth).

The communications chip 908 enables wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 908 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 900 may include a plurality of communication chips 908. For instance, a first communication chip 908 may be dedicated to shorter range wireless communications such as Wi-Fi and Bluetooth and a second communication chip 908 may be dedicated to longer range wireless communications such as GPS, EDGE, GPRS, CDMA, WiMAX, LTE, Ev-DO, and others.

The processor 904 of the computing device 900 includes one or more devices, such as host controllers and communication controllers that are formed in accordance with embodiments of the invention. The term "processor" may refer to any device or portion of a device that processes electronic data from registers and/or memory to transform that electronic data into other electronic data that may be stored in registers and/or memory.

The communication chip 908 may also include one or more serial links to peripherals that are formed in accordance with embodiments of the invention.

In further embodiments, another component housed within the computing device 900 may contain one or more override subsystems that are formed in accordance with implementations of the invention.

In various embodiments, the computing device 900 may be a laptop computer, a netbook computer, a notebook computer, an Ultrabook computer, a smartphone, a tablet, a personal digital assistant (PDA), an ultramobile PC, a mobile phone, a desktop computer, a server, a printer, a scanner, a monitor, a set-top box, an entertainment control unit, a digital camera, a portable music player, or a digital video recorder. In further implementations, the computing device 900 may be any other electronic device that processes data.

Embodiments of override subsystems provide a mechanism for rapid recovery from link errors while maintaining the connection to the peripheral and the software context of the peripheral drivers on the host. The override subsystems may be a flexible, configurable approach to manage MPHY states in Mobile SoC serial links. The override subsystems enable application-layer control of asynchronous entry into and exit from low-power operation modes to optimize both active and transition power use by a SoC. In some embodiments, the override subsystems may be used in survivability or other testing of MIPI lanes or other serial data connections. Although the content of the status and policy registers may be protocol-dependent, the overall concept may be adaptable to a variety of serial link protocols.

The preceding Description and accompanying Drawings describe examples of embodiments in some detail to aid understanding. However, the scope of the claims may also include equivalents, permutations, and combinations that are not explicitly described herein.

I claim:

1. A device, comprising:
    a link-layer component to implement a link protocol for a physical connection;
    a physical layer coupled between the link-layer component and the physical connection, the physical layer to control transmission and reception of messages on the physical connection; and
    a physical layer adapter between the link-layer component and the physical layer, wherein the physical layer adapter comprises an override controller, the override controller to identify an error code associated with the physical connection;
    a first override switch coupled to the override controller and positioned to act upon the physical layer adapter, the first override switch to connect the override controller to the physical layer adapter; and
    a second override switch coupled to the override controller and positioned to act upon the link-layer component, the second override switch to connect the override controller to the link-layer component, and the override controller to cause the first override switch to connect the override controller to the physical layer adapter or the second override switch to connect the override controller to the link-layer component in response to identification of the error code.

2. The device of claim 1, further comprising a first register coupled to the override controller, the first register to receive at least one of a state of the link-layer component or a state of the physical layer.

3. The device of claim 2, wherein an activation circuit of the override controller is responsive to a first code in the first register but not to a second code in the first register.

4. The device of claim 2, wherein:
    a mismatch between the state of the link-layer component and the state of the physical layer changes a content of the first register to the error code;
    the override controller looks up a policy code corresponding to the error code in response to the identification of the error code; and
    the override controller causes the link-layer component, the physical layer adapter, or a physical-layer configuration interface to execute an action prescribed by the policy code.

5. The device of claim 2, wherein the first override switch or the second override switch are further to disconnect the override controller from the physical layer when the first override switch is caused to connect the override controller to the physical layer adapter or the second override switch is caused to connect the override controller to the link-layer component.

6. The device of claim 1, wherein the physical layer comprises a transmitter and receiver connected to different parts of the physical connection.

7. The device of claim 1, wherein the link-layer component comprises a first link training and status state machine (LTSSM), and wherein the physical layer adapter comprises a second LTSSM.

8. The device of claim 7, wherein the second LTSSM is internal to the override controller.

9. The device of claim 1, wherein the link-layer component, the physical layer, and the physical connection include components to operate as a serial link to a peripheral in the absence of the physical layer adapter.

10. The device of claim 1, wherein the physical layer adapter comprises at least one register coupled to the override controller and a data-store coupled to the at least one register and wherein a first data path between the override controller, the at least one register, and the data-store does not coincide with a second data path involved in normal operation of the link-layer component or the physical layer.

11. The device of claim 10, wherein an output of the override controller is responsive to a code in the at least one register.

12. The device of claim 10, wherein the first data path and the second data path are coupled to an input of a multiplexer;
    wherein an output of the multiplexer is coupled to the physical layer; and
    wherein the first override switch and the second override switch determine whether the multiplexer transmits a first signal from the first data path or a second signal from the second data path, wherein the first signal from the first data path is transmitted in response to detection of an error associated with the physical layer.

13. The device of claim 1, further comprising a multiplexer coupled between the physical layer adapter and the physical layer, wherein the multiplexer is to select between a first signal path from the link-layer component and a second signal path from the override controller, and wherein the override controller is further to cause the multiplexer to select the second signal path in response to the identification of the error code.

14. The device of claim 13, wherein the multiplexer is a first multiplexer, the first signal path is a first transmission signal path, the second signal path is a second transmission signal path, and wherein the device further comprises a second multiplexer coupled between the physical layer adapter and the physical layer, wherein the second multiplexer is to select between a first reception signal path from the link-layer component and a second reception signal path from the override controller, and wherein the override controller is further to cause the second multiplexer to select the second reception signal path in response to the identification of the error code.

15. The device of claim 13, wherein the override controller is further to:
- identify a policy associated with the error code; and
- execute at least one action associated with the policy on the second signal path while the multiplexer has selected the second signal path, wherein the at least one action corrects an error associated with the error code.

16. The device of claim 15, wherein to identify the policy includes to:
- access a lookup table that includes a plurality of policies; and
- identity the policy associated with the error code from the plurality of policies.

\* \* \* \* \*